US005202133A

United States Patent [19]

Pesch et al.

[11] Patent Number: 5,202,133

[45] Date of Patent: Apr. 13, 1993

[54] APPARATUS FOR SPREADING A PARTICLE MASS

[75] Inventors: Jürgen Pesch, Krefeld-Traar; Friedrich Böttger, Haan, both of Fed. Rep. of Germany

[73] Assignee: G. Siempelkamp GmbH & Co., Krefeld, Fed. Rep. of Germany

[21] Appl. No.: 727,621

[22] Filed: Jul. 10, 1991

[30] Foreign Application Priority Data

Jul. 10, 1990 [DE] Fed. Rep. of Germany ....... 4021939

[51] Int. Cl.[5] .......................... B29C 39/14; B28B 5/02

[52] U.S. Cl. .................................... 425/83.1; 425/80.1

[58] Field of Search .................... 425/80.1, 81.1, 83.1; 264/109, 112, 113, 121; 156/62.2

[56] References Cited

U.S. PATENT DOCUMENTS 3,051,219 8/1962 Kaiser ................................ 264/109
3,435,106 3/1969 Hager ................................. 264/113
4,063,858 12/1977 Axer et al. ......................... 425/81.1
4,068,991 1/1978 Ufermann et al. ................. 425/81.1

FOREIGN PATENT DOCUMENTS 2535461 6/1977 Fed. Rep. of Germany .

*Primary Examiner*—Willard Hoag
*Attorney, Agent, or Firm*—Herbert Dubno

[57] ABSTRACT

A spreading unit which may be used for the spreading of particles for the production of thin pressed board or as a cover layer or face layer for a multilayer pressed board in conjunction with other spreading units along a belt upon which a mat of the mixture of particles and glue is to be formed. The spreading unit has a bunker and a discharge system for discharging a raw material stream in free-fall which is intercepted by an air classifier spreading the particles onto the belt in parabolic paths. In a region directly below the raw-material discharge and over a portion of the parabolic paths, a ball-collecting unit, for example a disk grate, is provided to intercept the balls while allowing the particles to pass without altering their classification. Fine particles of the parabolic paths beyond the ball catcher pass directly onto the belt.

9 Claims, 5 Drawing Sheets

APPARATUS FOR SPREADING A PARTICLE MASS

FIELD OF THE INVENTION

Our present invention relates to an apparatus for the spreading of a particle mass, e.g. for the spreading of the raw material used in the fabrication of a particle board to form a mat of this raw material which can be pressed.

More particularly, the invention relates to a spreading apparatus having means for removing from the spread material, generally wood particles such as wood chips or wood fibers, agglomerated balls of glue which can form in the mass.

BACKGROUND OF THE INVENTION

As explained in the commonly assigned copending application Ser. No. 07/714,168, filed 12 Jun. 1991, particle board can be fabricated by spreading a mass of particles admixed with an adhesive or glue upon a conveyor belt to form a mat which can be compressed, e.g. in a double-belt press or a platen press, into particle board. The pressing can be carried out in the presence of steam which can serve to activate the adhesive or glue and/or with the aid of a thermally-activated adhesive or glue.

Reference may also be made to the spreading apparatus described in German patent document DE 25 35 461, published Feb. 10, 1977.

In that system, the mixture of the particles and the glue from a bunker or bin is discharged utilizing a discharge conveyor belt and a back-stripping arrangement which controls the deposit of the mass upon the conveyor belt to a discharge end of this conveyor which forms a material-discharge zone. The material passing off the end of the feed conveyor in this zone may pass in front of an air distributor at which the freely falling mass is laterally entrained by an air blast and distributed over a receiving surface in the form of the aforementioned mat-collecting conveyor belt.

In this air blast distributor, which forms an air-sifting system, the raw material is deflected by the air jets so that it falls in a number of parabolic paths which are distinguished by the fact that the path assumed by the material is dependent upon the mass of the material horizontally entrained by the air stream. In other words, heavier material tends to fall closer to the original line of free-fall at the discharge region while lighter materials are blown further away from the direct fall line.

The particular parabolic path assumed by materials of a particular weight is controlled by the velocity of the air. This method of spreading the particle mass is especially suitable for use when the material is to form a fine layer, e.g. as the upper or lower face layer of a mat and hence pressed board constituted of a plurality of layers, the inner layers of which can be somewhat coarser than the fine face layers.

Spreading systems of this type do not preclude the formation of glue clumps, aggregates or agglomerates in the raw material mass. Such glue clumps or balls are detrimental to the quality of the fabricated pressed board, especially when they appear in thin pressed board or the glue clumps or balls appear in the cover layers or face layers of the pressed board.

It is desirable, therefore, to remove these balls from the raw material so that the balls do not end up in the mats and especially do not appear in the face layers of multilayer mats.

The removal of such glue agglomerates or balls has been found to be especially important when the mats of material are to be pressed between steel belts of continuously operating presses because such balls have been found to be detrimental to the belts, especially by reducing the useful life thereof.

In the spreading system of German patent document DE 25 35 461, the raw material discharge region is fitted with a disk sieve constituted from a multiplicity of disk rollers which rotate in the same sense and whose disks interdigitate and at their peripheries can be toothed.

The chips pass between the rotating disks of the disk grate thus formed and depending upon the interdisk spacing, can be subjected to a classification into fine material, medium material and coarse material. If balls of glue or adhesive are present in the raw material, these can be separated from the chips or particles which trickle through the disk grate and can be entrained to a side of the disk grate whence they are discharged.

The air sifting of the downwardly trickling particulate material can be provided in this system below the disk grate, especially between the disk grate and the conveyor belt receiving the mat.

The air classification can result in entrainment of the finest particles to the upstream side of the system counter to the movement of this conveyor belt to enable the deposition of a fine cover or face layer on the latter. While this system operates effectively in most instances, when the combination of the disk grate with the air sifting is not used as is the case for the production of especially thin pressed board or when the spreading device is used only for the formation of the face layer, it is found that balls or agglomerates of glue are formed and deposited upon the conveyor belt which can be detrimental to the system.

OBJECTS OF THE INVENTION

It is, therefore, the principal object of the present invention to provide an improved spreading apparatus capable of removing balls or agglomerates of glue from the material to be spread which avoids the drawbacks of the earlier system.

More particularly, it is an object of this invention to provide a spreading apparatus for the purposes described which can remove more effectively than earlier systems, glue balls and the like, especially for the production of thin pressed board for the production of facing layers for pressed board.

Another object of the invention is to provide a system utilizing both the disk sieve and air-sifting principles and which nevertheless ensures a complete removal of the balls before the material is deposited upon the mat forming a conveyor.

SUMMARY OF THE INVENTION

These objects and other which will become apparent hereinafter are attained, in accordance with the invention, in a spreading apparatus of the type in which the raw material from a bunker or bin is caused to deposit upon a delivery or feed conveyor, under the control of a back-stripping device and the material, generally including chips and glue which has been added to the chips, is permitted to fall through a delivery region toward the receiving conveyor, and an air-sifting arrangement is provided along the path of this material so that the material is induced to travel in parabolic paths determined by the mass of the material.

According to a feature of the invention, a ball-catching device is provided in the region of the parabolic paths and especially in a region below the discharge region and positioned to intercept the parabolic paths of the material having the greatest mass and upstream of the end of these paths so that the captured balls can be carried off in a direction opposite that in which the air-sifting blast is directed. The ball-collecting device can be dimensioned to pass the chips which may be present in these parabolic paths and the ball-collecting unit, e.g. a disk sieve, may be provided on its side which is upstream with respect to the direction of the air jets, with a unit for carrying off the collected balls.

German patent document 27 35 510 describes an air-sifting device for the raw material for the formation of particle board which has a region in which there is practically no sifting parabola and in which the largest particles fall in substantially undeflected free-fall and these large particles are collected on a conveyor which transports the collected particles in a direction transverse to the direction of entrainment during air sifting. This system has, however, the drawback that glue balls may continue to be entrained into the mass because frequently they are deflected to some extent by the sifting air and thus may not be collected upon the last-mentioned conveyor. Furthermore, a relatively large proportion of the chip material must be discharged when that chip material is relatively heavy.

The system of the invention, by contrast, provides a highly reliable and surprisingly effective means for eliminating agglomerates or balls of glue from the mass which is to be pressed into pressed board.

One of the principal advantages of the invention is that conventional air sifting can be used since the air sifting operation is not dependent upon any disk sieve thereabove. It can operate especially effectively for the production of thin pressed board or face layers as is conventional in the art. Notwithstanding the conventional operation for this purpose, however, glue balls which may be detrimental are prevented from passing into the mats to be pressed.

The ball-collecting disk grate extends substantially parallel to the mat-forming conveyor belt and collects the balls which have formed in the raw material to be pressed in a highly reliable manner since the air sifted chips can pass through the grate while substantially all of the balls are captured by the grate and deposited in the collection trough at the upstream end of the grate with reference to the direction of sifting air flow.

The grate gap and openings have their geometries and dimensions determined by the disk spacing and these openings and spacings and the box or recesses formed in the disks can be dimensioned as described in the aforementioned copending application so that a separation between the balls and the chips is effected, the chips can trickle through and the balls will be fully stopped. The requisite sieve geometry can be determined experimentally without difficulty.

According to a feature of the invention, the apparatus just described is utilized in conjunction with a further spreading machine and the further spreading machine is dimensioned to deposit coarse or large chips in the mat subsequent to the application of a cover layer in the manner described. In this additional device, the raw material discharge region includes a roller spreading head. Between the raw-material discharge and the roller-spreading head, a ball-collecting or ball-removal device is provided. This ball-removal device is also connected to a discharge device along one side of the sieve grate for collecting the balls.

According to another feature of the invention, in the direction of travel of the mat-forming conveyor belt and downstream of this coarse-particle spreader, another air-sifting spreading machine of this type described above can be provided to apply an upper cover layer to the coarse material of the mat.

In this case, of course, the first and last spreading machines of the apparatus are provided with air sifters and ball-collecting devices as described while between them one or more intermediate layer spreaders can be provided to form the intermediate layers.

More specifically, the spreader according to the invention can comprise:

a bunker containing the mass and provided with a discharge conveyor receiving the mass from the bunker and discharging the mass in a downward raw-material discharge;

an air classifier below the bunker directing at least one flow of air transverse to the raw-material discharge and in a direction opposite to a direction of travel of the conveyor belt to generate from the mass a multiplicity of discharge parabolas along which the particles of the mass travel downwardly toward the conveyor belt as a function of particle mass, the particle mass of the discharge parabolas being greater closer to a direct-fall path of the raw-material discharge for heavier particles and further from the direct-fall path for the fine particles;

a ball-catching device traversable by particles of the raw-material discharge and elongated in a direction of travel of the conveyor belt, the ball-catching device extending from the direct-fall path to a region below the discharge parabolas and terminating short of an end of the region remote from the direct-fall path for catching balls of agglomerated glue contained in the raw-material discharge while permitting passage of the particles of the discharge parabolas of the region below which the device is located, at least the fine particles at the end of the region depositing directly upon the conveyor belt without traversing the device; and means at a discharge side of the device for carrying off balls caught on the device.

The spreader may precede, along the conveyor belt upon which the mat to be pressed is formed, another spreader having a bunker arrangement and a ball catcher between the bunker and a roller device for depositing coarser particles upon the fine particle layer forming the face layer of the pressed board. Further downstream along the conveyor belt can be a spreader unit as described previously, utilizing air classification to form the upper cover layer on the mat.

The ball catcher or collection in each case or in the case of a single spreader unit can be formed in various ways, but preferably is a disk grate comprised of a plurality of rotating disk rollers having interdigitating disks and whose disks spacing defines the particle size of the wood particles which pass through the disk grate onto the conveyor belt.

At one side of the disk grate, a collector is provided into which the balls are cast by the rotating disks and by means of which the balls can be carried off, e.g. by a conveyor running in the trough.

The system of the invention thus allows for the use of a single spreader or a plurality of spreaders for providing multilayer pressed board. The spacing between the disks should be such that the balls do not pass through the disk grate and are transported away by the rotating disks while the particles of the desired size pass through the grate.

The system of the invention ensures reliable capture and removal of the balls without detriment to the air-classification separation of the particles into fine particles and coarser particles.

BRIEF DESCRIPTION OF THE DRAWINGS

The above and other objects, features and advantages of the present invention will become more readily apparent from the following description, reference being made to the accompanying drawings in which.

SPECIFIC DESCRIPTION

Figure 1:
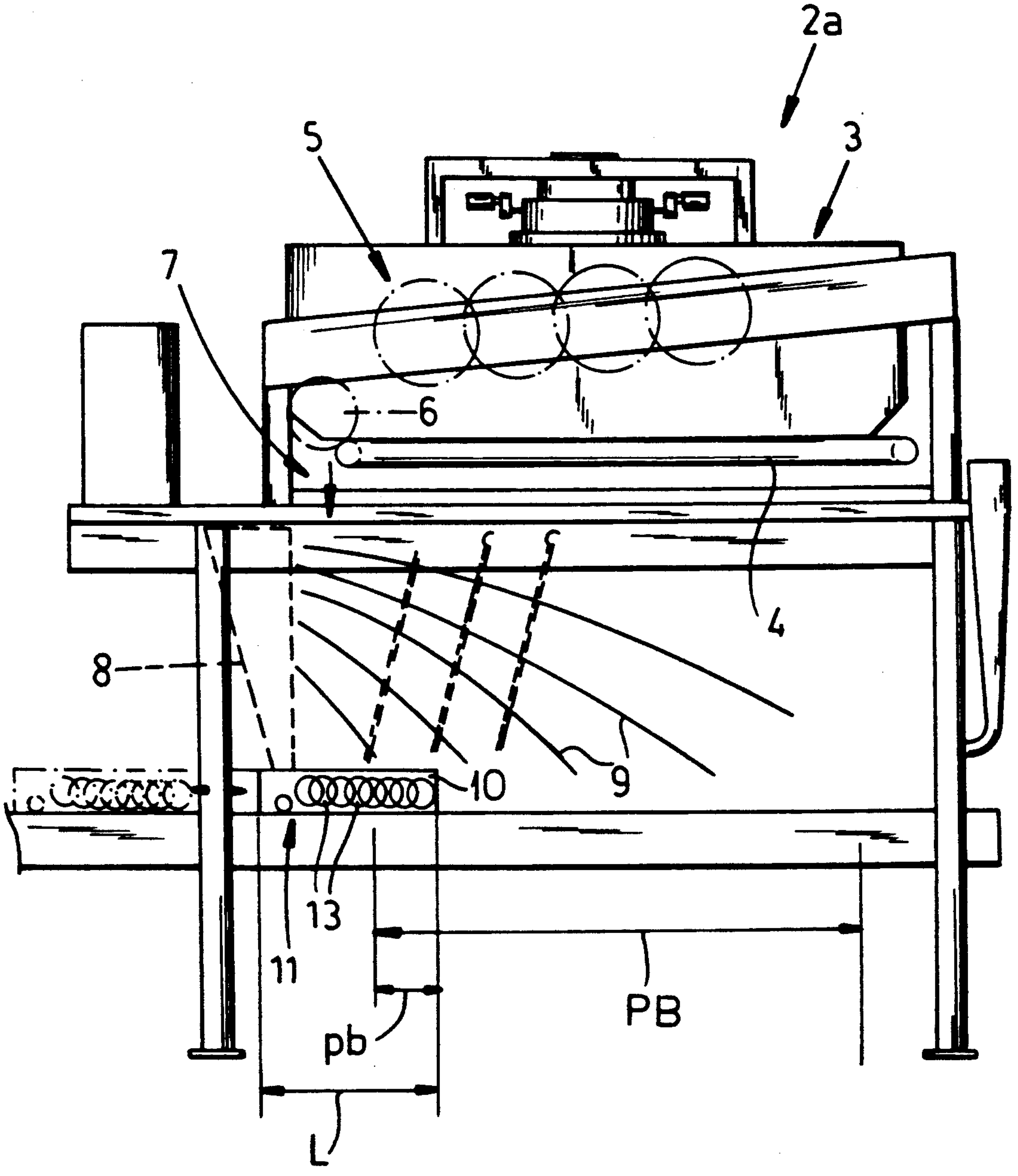
FIG. 1 is a side-elevational view of a spreading machine according to the invention using an air-classification system.
Figure 2:
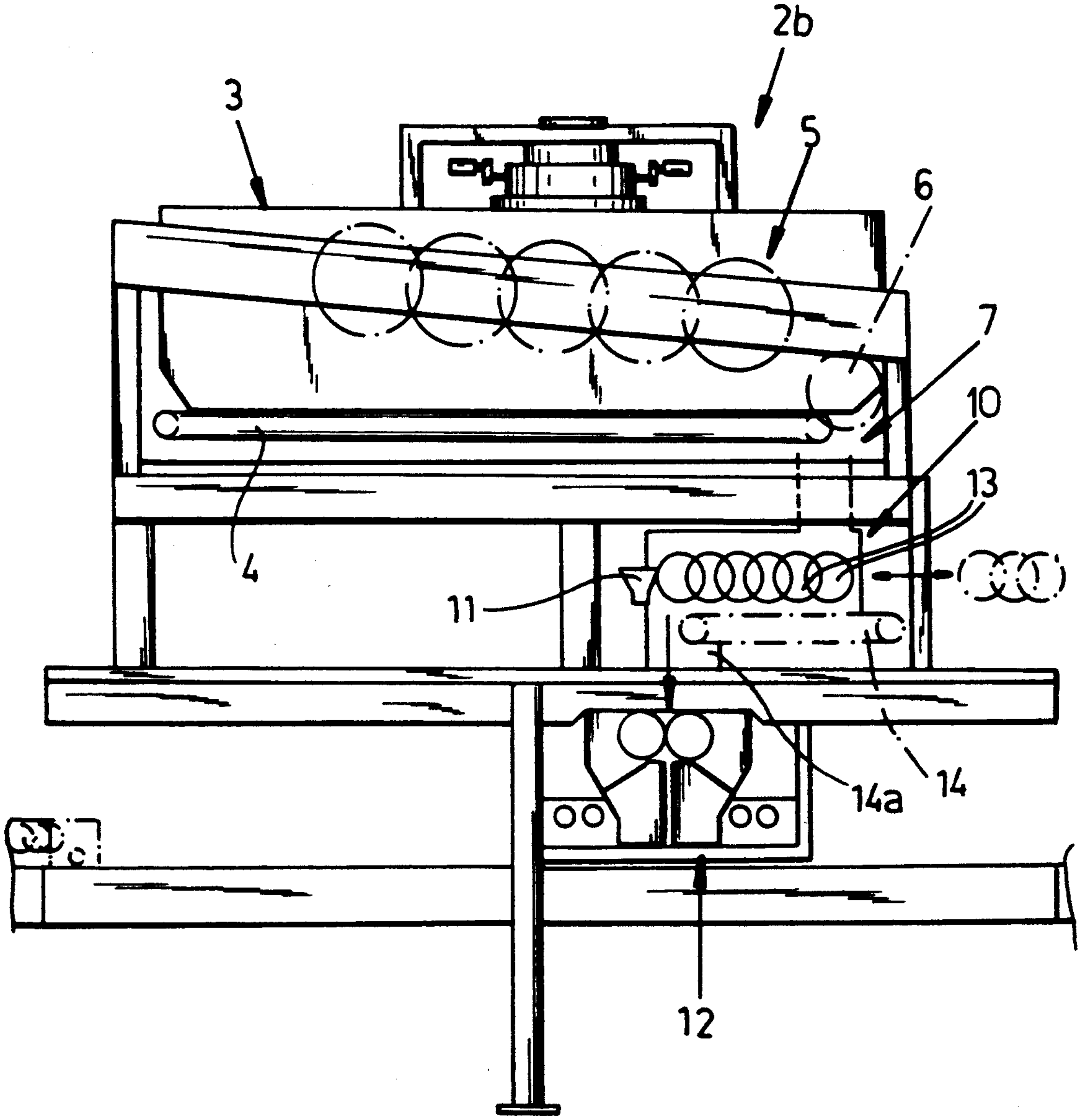
FIG. 2 is a side-elevational view of a spreading machine in which the spreading device operates without air classification.
Figure 3:
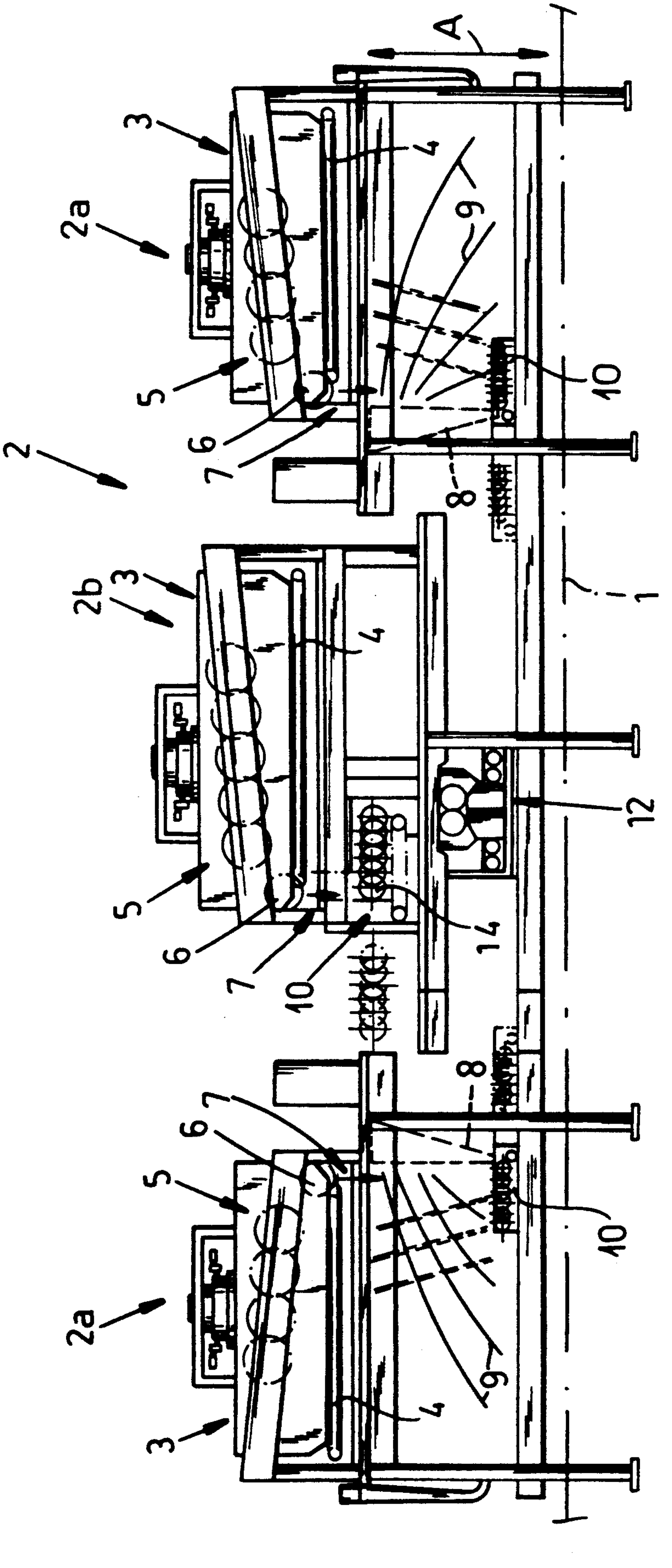
FIG. 3 is a side-elevational view of an apparatus for forming a multilayer mat to be pressed into pressed board and in which two spreading units with air classification for forming face layers flank a spreading unit without air classification for forming an intermediate layer.

FIGS. 1 and 2 show individual spreading units and FIG. 3 illustrates an apparatus for spreading wood particles in a mat for the production of pressed board utilizing a plurality of spreading units. The mat is formed on a conveyor belt 1 which can feed the mixture of particles and glue or adhesive to an appropriate press, for example, a continuously-operated double-belt press.

The spreading apparatus comprises at least one spreading unit 2*a* (FIG. 1) or 2*b* (FIG. 2). The spreading machine has a bunker or bin 3 for the mixture of wood particles and adhesive or glue, a discharge conveyor 4 by means of which the mixture is metered from the bunker or bin to a raw-material discharge 7, a discharge roller 6 at the discharge side of the conveyor 4, and a back-stripping unit 5 (see the aforementioned patent application) for controlling the material on the belt 4. The raw material can comprise particles or chips for the production of thin pressed board or for face layers of thick pressed board in the case of the spreader of FIG. 1.

Figure 6:
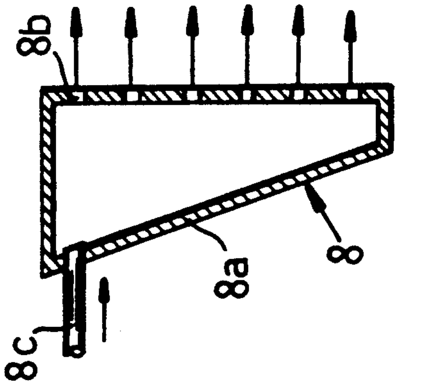
FIG. 6 is a detail view of the wind box of an air classifier.

From FIGS. 1 and 3 it will be apparent that the raw material discharge 7 begins at a point A at a distance above the belt 1 upon which the layer is formed, this distance A being spanned by an air classifier 8 for spreading the raw material of this discharge. The air classifier 8 can comprise a wind box 8 formed with orifices 8*b* through which air jets emerge and which is fed with compressed air by the pipe 8*c* (FIG. 6).

As the flow of raw material passes in front of the wind box 8*a*, therefore, depending upon the particle mass, discharge parabolas 9 are formed, as determined by the mass of the particles and the air velocity from the jets.

As is especially apparent from FIG. 1, between the raw-material discharge 7 and the conveyor belt 1, in the region of the parabolas 9, a ball-collecting device 10 is provided which extends from the region directly below the raw-material discharge 7 across the parabolic paths 9 but terminates before the end of the parabolic path region.

Thus, if the parabolic path region is represented in FIG. 1 as the region PB, the ball collector 10 can extend from the region directly below the raw-material discharge 7 over a portion pb of the parabolic path region. The ball collector 10 is formed with a trough or other collector 11 for the balls and the catcher 10 is so formed that the particles falling thereon can trickle through to deposit on the conveyor 1 in a manner which does not alter the classification formed by the air classifier although any captured balls are carried away.

The length L of the ball catcher 10 in the direction of the parabolic paths 9 can be selected so that it extends over all of the parabolic paths which may contain glue balls. Thus, the mat formed on the conveyer belt 1 will be free from such glue balls.

In FIG. 2 there is shown a spreading unit 2*b* which is designed to form the intermediate layer for layers of a pressed board and is capable of depositing coarser particles upon the belt 1. In this embodiment, below the raw-material discharge 7, a roller-spreading head 12 of conventional design is provided and between this roller-spreading head 12 and the raw-material discharge 7, a ball catcher 10 is disposed. The ball catcher 10 is provided with a collector for the balls as shown at 11. Below the ball catcher 10, a further belt 14 is provided for delivering particles which trickle through the ball catcher to a discharge shoot 14*a* feeding the particles to the roller-spreading head 12.

FIG. 3 illustrates an apparatus wherein along the conveyor belt 1, there are disposed two spreading units 2*a* with air classification and ball catchers 10 as described in connection with FIG. 1 for producing fine-particle face layers at the bottom and top of the mat deposited upon the belt 1 and a spreading unit 2*b* of the type described in connection with FIG. 2 for applying the intermediate layer of coarser particles to the mat.

Figure 4:
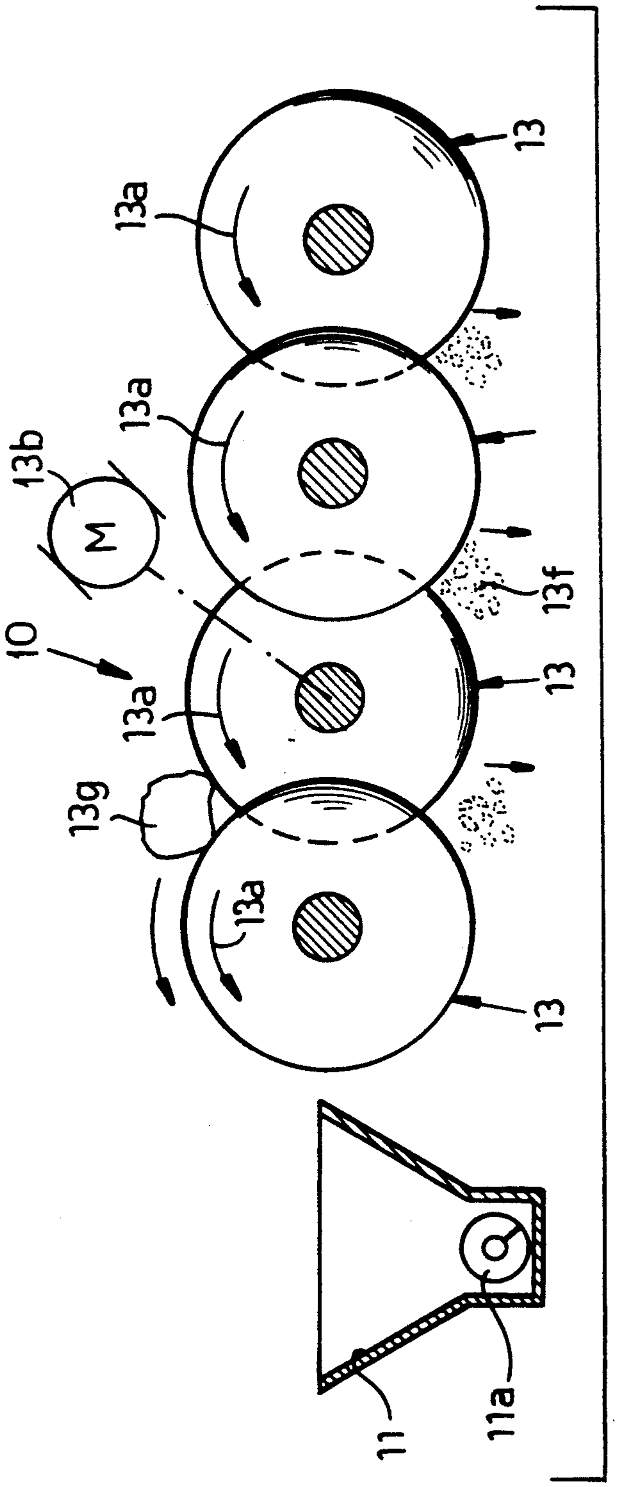
FIG. 4 is a cross section through a disk grate serving as a ball catcher for any of the spreading units mentioned above.
Figure 5:
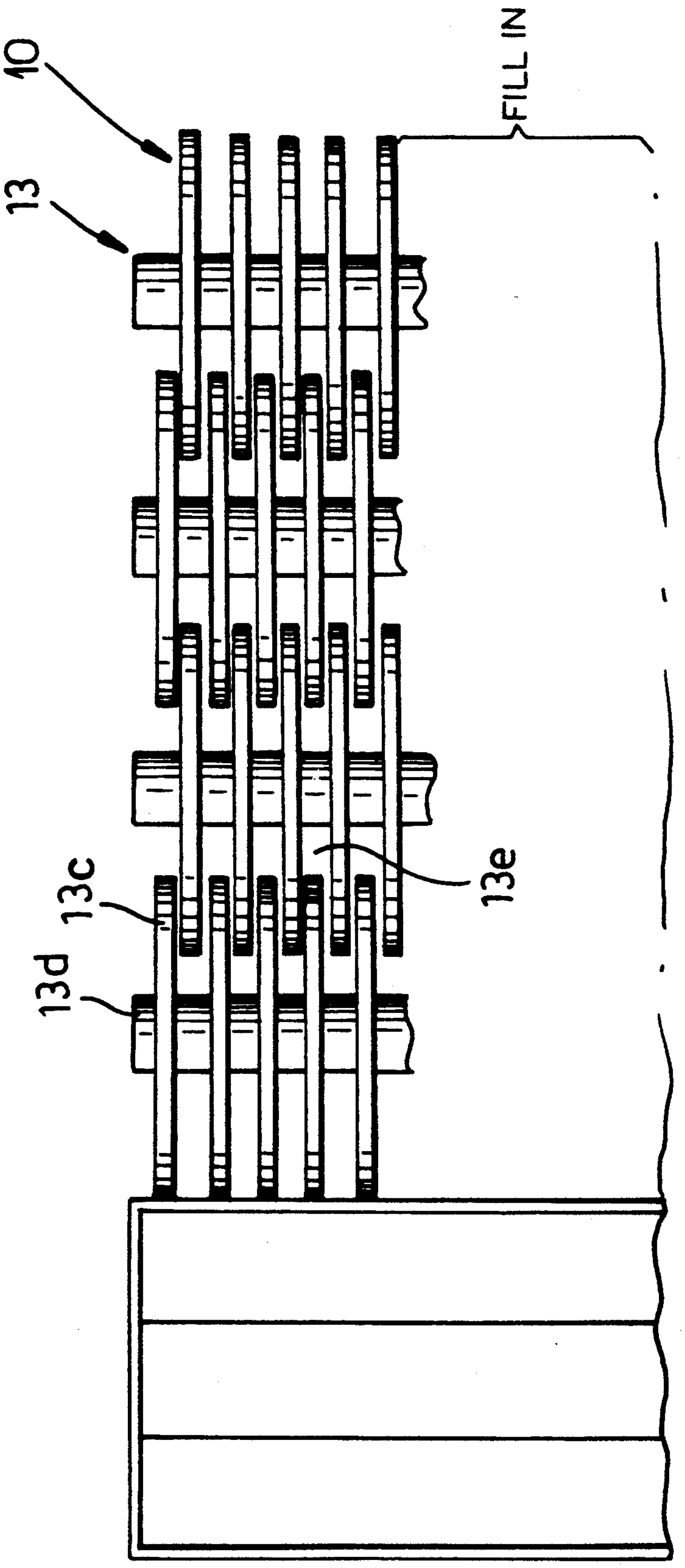
FIG. 5 is a partial plan view of this ball catcher.

The ball catcher 10 in each case can be constituted as described in German patent document DE 25 35 461 and as is more generally described below. Each ball catcher 10 (see also FIGS. 4 and 5), comprises a disk grate constituted of a plurality of disk rollers 13 all of which are rotatable in the same sense as is shown at 13*a* in FIG. 4. A motor 13*b* is coupled to the disk rollers 13 for rotating them.

The disk rollers 13 comprise disks 13*c* mounted on shafts 13*d* and the disks of the rollers interdigitate with one another (see FIGS. 4 and 5) so that the interdisk spacings 13*e* define the particle size of the particles 13*f* which trickle through. The balls of glue, as represented at 13*g*, are captured by the disk grate and are entrained into the collector 11, which may be a trough provided with means, e.g. a worm conveyor 11*a*, for carrying off the balls.

We claim:

1. A spreader for depositing at least one layer of a particle and glue containing mass of a flowable material upon a conveyor belt as a ray material in the forming of a mat to be pressed into pressed board, said mass containing fine particles for forming a face layer of said pressed board, said spreader comprising:

a bunker containing said mass and provided with a discharge conveyor receiving said mass from said bunker and discharging said mass in a downward raw-material discharge;

an air classifier below said bunker directing at least one flow of air transverse to said raw-material discharge and in a direction opposite to a direction of travel of said conveyor belt to generate from said mass a multiplicity of discharge parabolas along which said particles of said mass travel downwardly toward said conveyor belt as a function of particle mass, the particle mass of the discharge parabolas being greater closer to a direct-fall path of said raw-material discharge for heavier particles and further from said direct-fall path for said fine particles;

a ball-catching device traversable by particles of said raw-material discharge and elongated in a direction of travel of said conveyor belt, said ball-catching device extending from said direct-fall path to a region below said discharge parabolas and terminating short of an end of said region remote from said direct-fall path for catching balls of agglomerated glue contained in said raw-material discharge while permitting passage of the particles of said discharge parabolas of said region below which said device is located, at least said fine particles at said end of said region depositing directly upon said conveyor belt without traversing said device; and means at a discharge side of said device for carrying off balls caught on said device.

2. The spreader defined in claim 1, further comprising another spreading unit disposed downstream of said bunker, said air classifier and said ball-catching device and comprising a raw-material discharge formed with a roller-spreading head and above said roller-spreading head a further ball-catching device provided with means for collecting the caught balls, said other spreading unit being dimensioned to pass particles coarser than said fine particles whereby said coarser particles are deposited upon the layer formed upstream of an intermediate layer of said coarser particles on said conveyor belt.

3. The spreader defined in claim 2, further comprising a further spreading unit including a respective bunker, air classifier and ball-catching device for applying a fine-particle layer to said intermediate layer.

4. The spreader defined in claim 3 wherein each of said devices comprises a disk grate formed with interdigitating disk rollers rotatable in the same sense and having a discharge trough along a side of the grate at which collected balls are discharged.

5. The spreader defined in claim 4 wherein said disks of said disk rollers have a spacing dimensioned to pass particles of a size corresponding to the particle size of a layer formed by the respective unit.

6. The spreader defined in claim 2 wherein each of said devices comprises a disk grate formed with interdigitating disk rollers rotatable in the same sense and having a discharge trough along a side of the grate at which collected balls are discharged.

7. The spreader defined in claim 1 wherein said device is a disk grate comprised of disk rollers having interdigitating disks rotatable in a sense conveying said balls to said means at said discharge side of said device for carrying off said balls.

8. The spreader defined in claim 1 wherein said discharge side of said device is a trough.

9. The spreader defined in claim 1, further comprising a back stripping device in said bunker for controlling the transfer of said mass to said discharge conveyor.

* * * * *